United States Patent
Hardman

(10) Patent No.: US 7,392,356 B1
(45) Date of Patent: Jun. 24, 2008

(54) PROMOTION OR DEMOTION OF BACKUP DATA IN A STORAGE HIERARCHY BASED ON SIGNIFICANCE AND REDUNDANCY OF THE BACKUP DATA

(75) Inventor: Daniel H. Hardman, American Fork, UT (US)

(73) Assignee: Symantec Corporation, Cupertino, CA (US)

( * ) Notice: Subject to any disclaimer, the term of this patent is extended or adjusted under 35 U.S.C. 154(b) by 284 days.

(21) Appl. No.: 11/220,134

(22) Filed: Sep. 6, 2005

(51) Int. Cl.
*G06F 12/00* (2006.01)
*G06F 13/00* (2006.01)
*G06F 13/28* (2006.01)

(52) U.S. Cl. .................... 711/162; 711/100; 711/161
(58) Field of Classification Search .................. None
See application file for complete search history.

(56) References Cited

U.S. PATENT DOCUMENTS 6,275,898 B1 * 8/2001 DeKoning .................. 711/114
2003/0221060 A1 * 11/2003 Umberger et al. ........... 711/114
2007/0011420 A1 * 1/2007 Boss et al. .................. 711/165

OTHER PUBLICATIONS

Bolik, Christian, TSM HSM Explained,2003,IBM Corporation at 2003 Oxford University TSM Symposium, 18 pages.*
Janakiraman et al.,Automated Multi-Tier System Design for Service Availability,2003, Hewlett Packard,24 pages.*
Christine Chudnow, Mar. 2002, Computer Technology Review archived on http://findarticles.com/p/articles/mi_m0BRZ/is_3_22/ai_110262681, 7 pages.*

* cited by examiner

*Primary Examiner*—Hyung Sough
*Assistant Examiner*—Gary W Cygiel
(74) *Attorney, Agent, or Firm*—Holland & Hart

(57) ABSTRACT

Moving backup data within a storage hierarchy based on a calculated uniqueness of the backup data and on the estimated significance of at least a portion of the backup data. More unique and significant backup data would tend to have higher availability levels. Conversely, less unique and significant backup data would tend to have lower availability levels, or may even cause the backup data to be deleted.

20 Claims, 5 Drawing Sheets

PROMOTION OR DEMOTION OF BACKUP DATA IN A STORAGE HIERARCHY BASED ON SIGNIFICANCE AND REDUNDANCY OF THE BACKUP DATA

BACKGROUND OF THE INVENTION

Computing technology relies on ready access to data and instructions. The data and instructions may be present in volatile memory, or in non-volatile storage. Volatile memory tends to have faster access times, but is typically more expensive per byte, and does not survive a power cycle. Non-volatile memory tends to have slower access times, but is less expensive per byte, and does survive power cycles. Most sophisticated computing systems include both volatile memory and non-volatile storage so as to accentuate the advantages of each.

Even within the category of non-volatile storage, there is a storage hierarchy present in every computing system that has storage. The storage hierarchy has multiple levels of availability. In a very simple storage hierarchy, there are only two levels of availability; specifically, either the data is present in the only form of storage that the system has (representing the higher level of availability), or the data is not in the storage at all (representing the lowest level of availability possible). Other computing systems have more than two levels of availability in their storage hierarchy. For instance, an example of a four level storage hierarchy could have an internal high performance SCSI disk drive with 10,000 rotations per minute (rpm) and with RAID as the highest level of availability, a lower performance internal disk drive with only 5400 rpm access speed as the next highest level of availability, a tape drive as the next level of availability, and unavailable storage (or no storage) being the lowest possible level of availability.

Typically, the higher the availability level of the storage, the more expensive the storage per unit byte. In backup environments, in which backups can occupy significant amounts of storage, there can be more backup data to store than there is storage available in the highest level of storage. In that case, care is often taken so that the more useful data is included in the highest level of storage, while the less useful data is relegated to a lower level of storage, or even is perhaps deleted, as appropriate, given the utility of the data.

Given the large amounts of backup data to be stored, it is often difficult for a user to determine what backups should be placed where in the storage hierarchy. A number of conventional mechanisms have been developed to perform automated storage hierarchy management; which are often applied to the backup data management problem. For instance, some storage management systems demote backup data from a higher level of availability to a lower level of availability depending on the age of the data. However, demotion based on the age of the data alone may not serve the user well if the data is accessed often. Other conventional storage management systems may promote or demote data within the storage hierarchy depending on previous access history. More frequently accessed data is kept or promoted to the higher levels of storage, whereas less frequently accessed data is kept or demoted to lower levels of storage, or are even perhaps deleted.

Consider, for example, a backup environment in which multiple computers regularly back up to a single backup server. The available high level storage of the backup server may be quickly exhausted. Accordingly, there may be off-lining policies imposed by the backup server that are based on age. For instance, if a backup from a computing system is more than ninety days old, perhaps the backup is demoted to a lower level of availability, or is even perhaps deleted. However, off-lining policies based exclusively on age or access history may not always off-line optimally.

BRIEF SUMMARY OF THE INVENTION

The foregoing problems with the prior state of the art are overcome by the principles of the present invention, which are directed towards moving backup data within a storage hierarchy based on a calculated uniqueness of the backup data, as well as based on an estimated significance of at least a portion of the backup data. The significance score may be a function of at least the size of the data, but may also use a variety of other input factors. More unique and more significant backups thus get higher priority for high availability levels in the storage hierarchy than do less unique and less significant backups.

Additional embodiments the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to the automated promotion and demotion of backups within a storage hierarchy based on a calculated uniqueness of the backup, and based on an estimated significance of at least a portion of the backup data. First, a general computing system will be described with respect to FIG. 1, as being a suitable computing system that may be used to practice the principles of the present invention. Then, the principles of the present invention will be described with respect to FIGS. 2 through 5.

Figure 1:
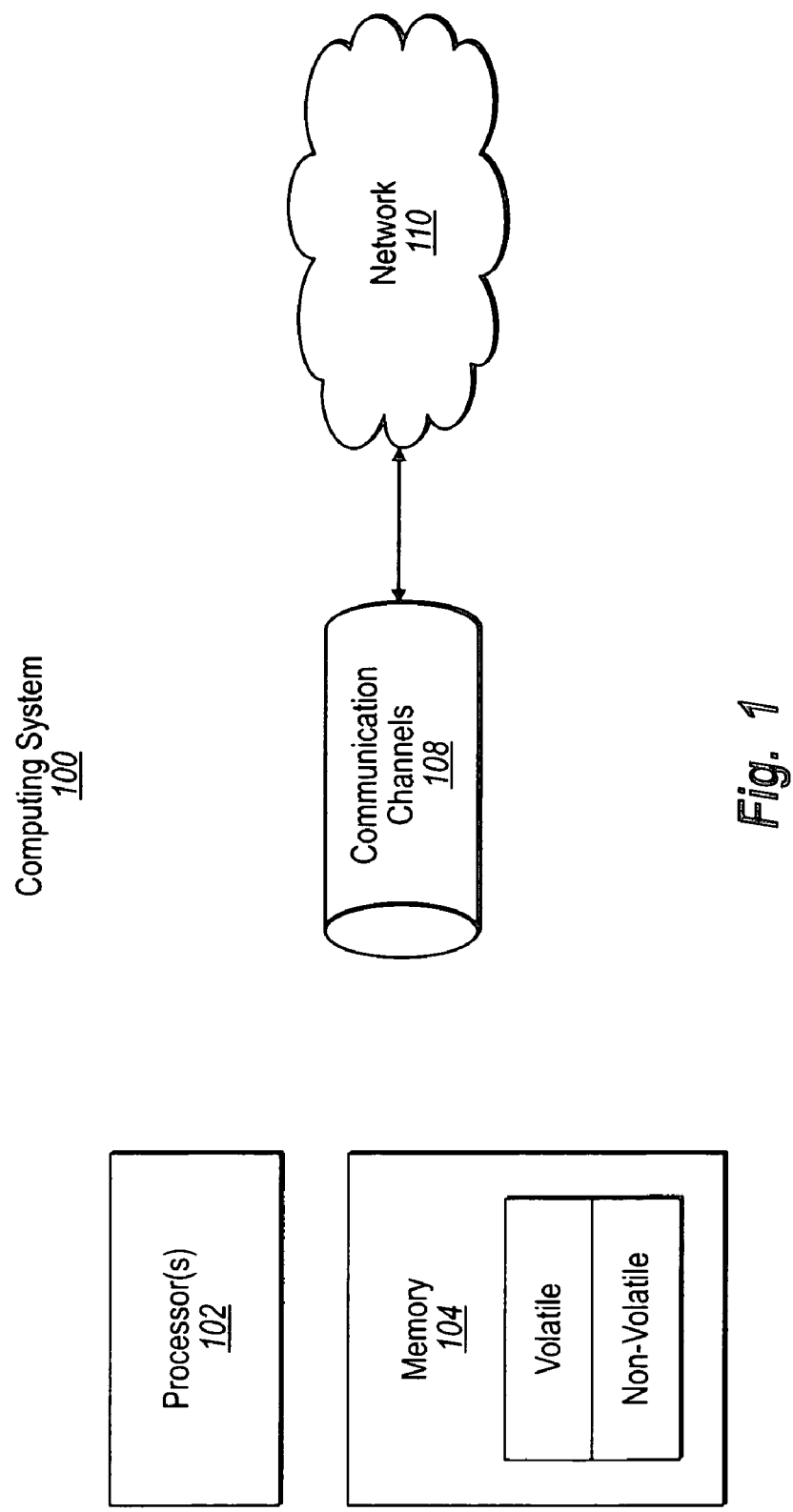
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide-variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, disk drives and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having as executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
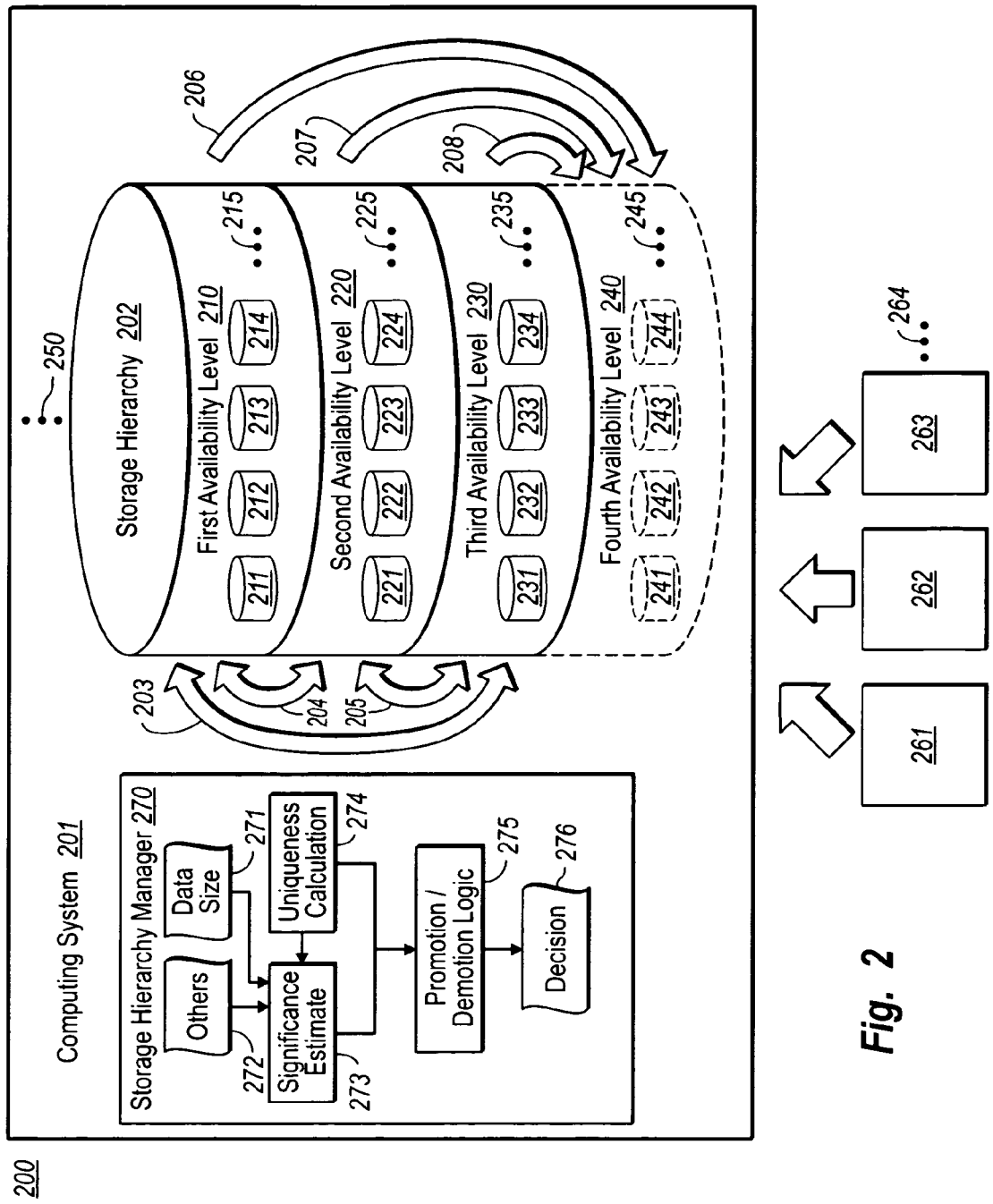
FIG. 2 illustrates an example computing environment including a computing system with a storage hierarchy and a storage hierarchy manager for managing promotion and demotion of backups within the storage hierarchy.

FIG. 2 illustrates an example computing environment 200 in which the principles of the present invention may be practiced. The environment 200 includes a computing system 201, which may (but need not) be structured as described above for the computing system 100 of FIG. 1. The computing system 201 includes a storage hierarchy 202 having a number of availability levels. While the principles of the present invention may operate with a storage hierarchy having any number of availability levels, the storage hierarchy 202 is illustrated as including four availability levels 210, 220, 230, and 240, amongst potentially others as represented by the ellipses 250.

In the example, availability level 210 represents the highest level of availability, whereas availability level 240 represents the lowest availability level. For instance, availability level 210 includes backups 211 through 214, amongst potentially others as represented by the ellipses 215. The highest availability level 210 may be, for example, a high performance internal disk drive having 10,000 rpm access speed and being equipped with RAID. The second availability level 220 may also include multiple backups 221 through 224, amongst potentially others 225, and may be, for example, a lower performance internal disk drive having 5,400 rpm access speed. The third availability level 230 also includes multiple backups 231 through 234, amongst potentially others 235, and may be, for example, a tape backup, which typically takes more time to access than an internal disk drive, but is less expensive than a disk drive per byte of storage. The last availability level 240 may include all deleted backups, and may be conceptual only as represented by the dotted lines. In that case, backups 241 through 244 amongst potentially others 245 are shown conceptually as deleted backups. Computing systems 261 through 264 may provide regular backup images to the computing system 201. Each backup comprises all or components of multiple files, and may even encompass an entire volume of storage.

The computing system 201 also includes a storage hierarchy manager 270. While the storage hierarchy manager 270 may be implemented exclusively in hardware, it may also be implemented using software. For instance, if the computing system 201 is structured as described above for the computing system 100, the storage hierarchy manager 270 may be a module or component (or a group of modules or components) that are instantiated in volatile portions of memory 104 in response to the execution of computer-executable instructions that may be stored in non-volatile or volatile portions of memory 104.

Figure 3:
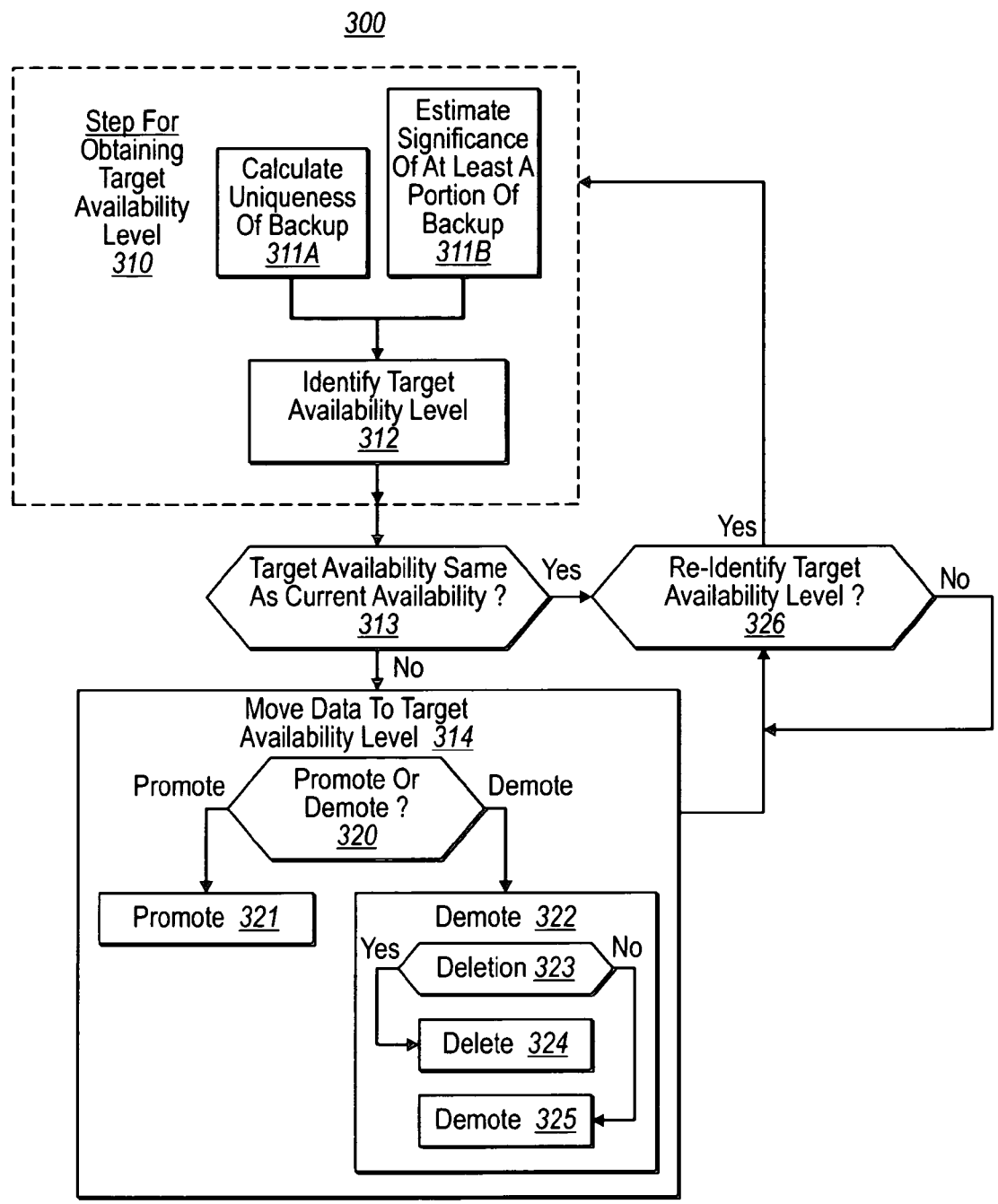
FIG. 3 illustrates a flowchart of a method for automatically promoting or demoting backups within a storage hierarchy according to a calculated uniqueness and estimated significance of the data in accordance with the principles of the present invention.

Regardless of whether implemented in hardware, software, or a combination of hardware or software, the storage hierarchy manager 270 performs a method for moving backup data within the storage hierarchy. FIG. 3 illustrates a flowchart of a method 300, which represents an example of such a method. Referring back to FIG. 2, the storage hierarchy manager 270 may perform the method in order to promote or demote backups within the first three availability levels as represented by bi-directional arrows 203 through 205, or to demote data sets to the fourth availability level (representing deletion) as represented by unidirectional arrows 206 through 208. The data and components illustrated within the storage manager 270 will be described in further detail in the subsequent description of the method 300 of FIG. 3.

The method 300 may be performed for multiple backups in order to promote or demote the backups to different availability levels if appropriate. For instance, if appropriate, a backup may be moved from the third availability level 230 to the second availability level 220, and then to the first availability level 210 in response to an increasing significance or uniqueness of the backup and/or increased available storage in the first availability level 210. Subsequently, if the uniqueness or significance of the backup were to decline, the backup may be moved from the first availability level 210 to the second availability level 220, to the third availability 230, and finally to the fourth availability level 240 through deletion. For instance, the uniqueness of a backup may increase if one of its temporally neighboring backups is demoted or deleted since the next neighboring backup will now be more distant in time. The method 300 of FIG. 3 will now be described for one move of the backup, although the method 300 permits repeating for multiple such moves over time.

The method 300 includes a functional, result-oriented step 310 for obtaining a target availability level in the storage hierarchy for a backup. In the illustrated embodiment, the step 310 includes corresponding acts 311A, 311B and 312.

Specifically, the uniqueness of the backup is calculated (act 311A). In backup technology, one backup may have data that is significantly redundant with a prior or subsequent backup. It is conceivable that a backup may be entirely redundant with a subsequent backup. For instance, consider the final incremental backup taken before the next full backup. Perhaps there was no change to the blocks or files captured in the final incremental backup between the time of the incremental backup, and the time of the next full backup. In that case, deleting the final incremental backup would result in no loss of data whatsoever. In other cases, a backup may have no redundant data with a neighboring backup. Typically, however, a backup will have some redundant data with a neighboring backup. The calculated uniqueness of a backup will sometimes be referred to herein using symbol "U", which may be expressed in units of MB or the like. The uniqueness calculation may be performed by the storage hierarchy manager 270 of FIG. 2 using the uniqueness calculation component 274.

Figure 5:
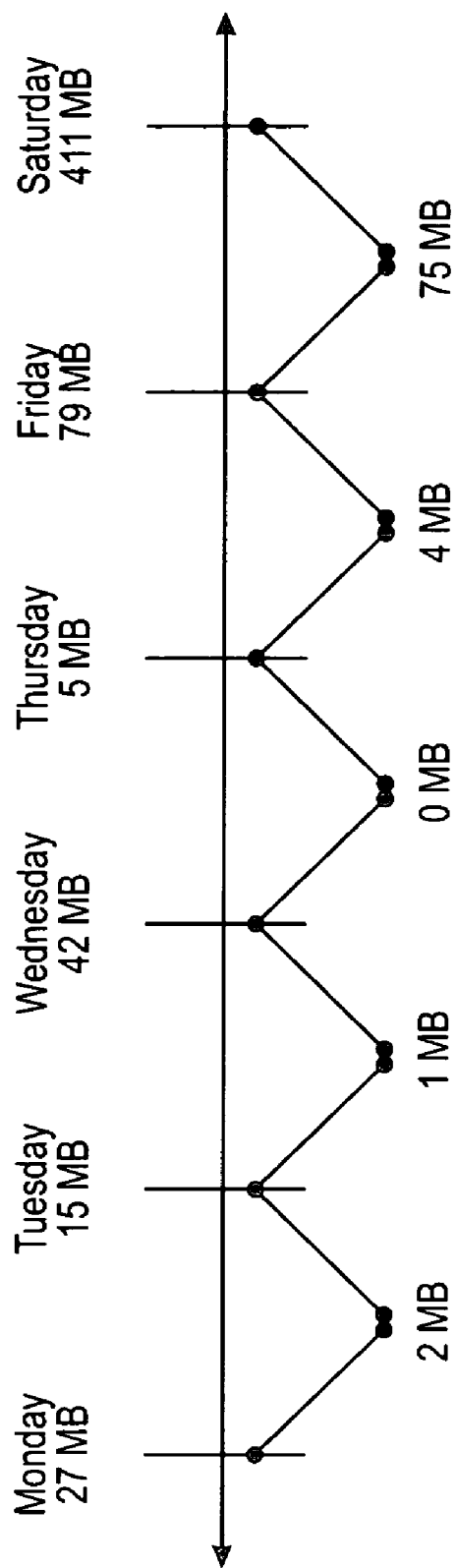
FIG. 5 illustrates an example of daily backups that occur over the span of six days in which there is often some level of redundancy between backups.

For example, referring to FIG. 5, Tuesday's backup has a size of 15 megabytes (MB) whereas Monday's backup has a size of 27 MB. However, there is 2 MB of redundant data between the two backups. Accordingly, if Monday's backup were deleted, there would be a loss of 25 MB (i.e., 27 MB minus 2 MB). On the other hand, Friday's backup has a size of 79 MB with the preceding backup (Thursday's backup) having a size of 5 MB. Thus, there is 4 MB of common data between the two backups.

In addition to calculating the uniqueness of the backup, the significance of at least a portion of the backup is calculated (act 311B). The significance may be calculated with respect to only the unique portions of the backup (hereinafter designated by the variable "$S_u$"), with respect to all of the backup (hereinafter designated by the variable "$S_{All}$"), and/or with respect to the non-unique (i.e., redundant) data (hereinafter designated by the variable "$S_r$").

In the context of FIG. 2, the relevant significant estimation(s) may be generated by using the significance estimation component 273. The significance estimation component 273 may use the size 271 of the item begin tested for significance as an input factor. For instance, if estimating the significance of the unique data of the backup, the size of the unique data is considered. If estimating the significance of all of the backup, the entire size of the backup is considered. The significance estimation component 273 may potentially other input parameters 272 to estimate the significance. While any mechanism for estimating a significance will suffice, an intricate calculation method will be described further below with respect to FIG. 4 in which a significance score is assigned to the item being tested. The significance estimation component 273 may also receive information from the uniqueness calculation component 274 such as, for example, the size of the unique data.

A target availability level is then identified based at least indirectly upon the calculated uniqueness of the backup data, and based at least indirectly on the estimated significance (act 312). For instance, referring to FIG. 2, the various availability levels may each be associated with a particular range of utility scores. When a utility score is assigned to backup data, the target availability level having a range in which the utility score resides is then identified as the target availability level. If the target availability level is the same as the current availability level (Yes in decision block 313), the method 300 pauses for that backed up data (No in decision block 326), until it is once again time to identify the target availability data (Yes in decision block 326). Referring to FIG. 2, the target availability level may be identified by the promotion/demotion logic 275, which generates a decision 276 on the target availability level for the backed up data.

If, on the other hand, the target available level is not the same as the current availability level (No in decision block 313), the backup data is moved to the identified target availability level (act 314). If the decision 276 indicates that promotion of the backup data is appropriate ("Promote" in decision block 320), then the backup data is promoted (act 321). For instance, backup data 231 in the third availability level might perhaps be promoted to the second available level 220, or the first availability level 210, or perhaps the backed up data 221 is promoted to the first availability level 210. If the decision 276 indicates that demotion of the backup data is appropriate ("Demote" in decision block 320), then the backup data is demoted (act 322). Demotion may potentially involve deletion of the backed up data (act 324) if the target availability level is the lowest availability level (Yes in decision block 323). For instance, backup data 211, 221 or 231 may each be demoted to the fourth availability level 240. Demotion may also involve the demotion of the backup data without deletion (act 325) if the target availability level is not the lowest availability level (No in decision block 324). For instance, backed up data 211 may be demoted to the second availability level 220 or the third availability level 230, or perhaps the backup data 221 is demoted to the third availability level 230.

Once the backup data is appropriately moved (act 314), or if the target availability level is already the same as the current availability level (Yes in decision block 313), the method pauses (No in decision block 326), until the next time the target availability level is calculated (Yes in decision block 326). The target availability level may be continuously calculated, or may be calculated periodically and/or in response to certain events (such as a change in scoring policy or an adjustment in the size of storage in any particular availability level). If the utility score is to be recalculated for the backup data, the method 300 may re-calculate the uniqueness of the backup data, and/or re-estimate the significance(s) (acts 311A and 311B). If the utility score is not to be recalculated for the backup data, then the method 300 may be repeated by first identifying the target availability level (act 312) without reassigning the utility score (act 311).

As previously mentioned, the utility score may be a function of the overall uniqueness of the backup data, as well as the estimated significance of the entire backup, the unique portions of the backup, and/or the redundant portions of the backup. The following Equation (1) is an example of how the utility score (designated as "Score") may be calculated:

$$\text{Score} = (W_U \times S_U) + (W_{All} \times S_{All}) \text{ where } W_U > W_{All} \quad (1)$$

and where:

$W_U$ is the weighting factor for the unique data;
$W_{All}$ is the weighting factor for all of the backup;
$S_U$ is the significance estimation or score for the unique data; and
$S_{All}$ is the significant score estimated on the entire backup.

In one embodiment, the weighting factor for the unique data may be perhaps three times that of all of the backup.

Figure 4:
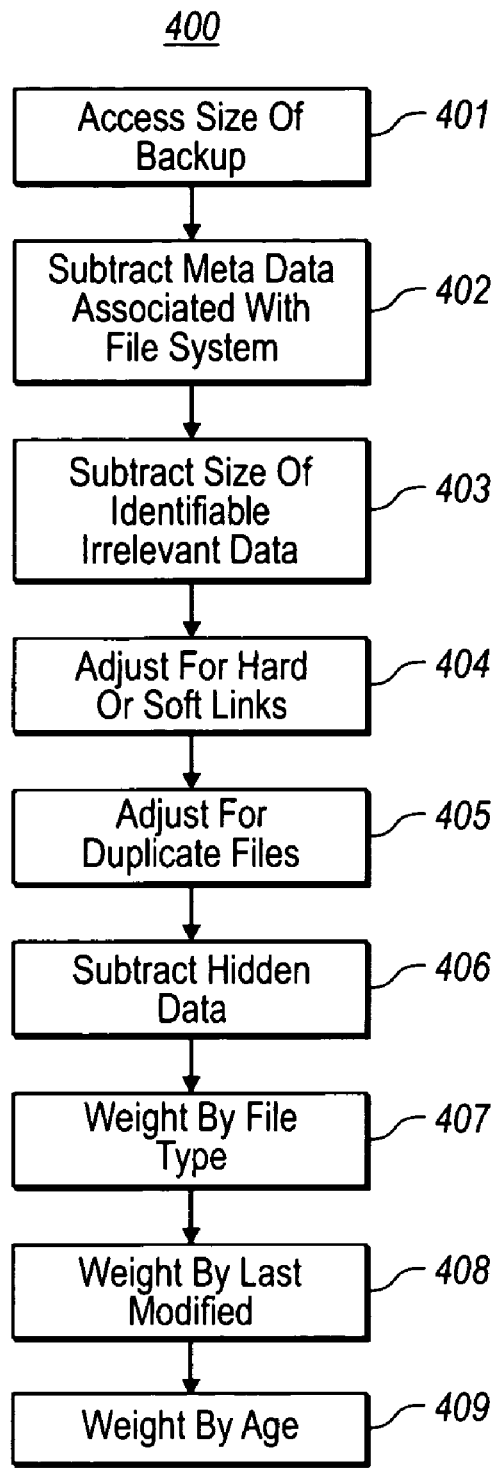
FIG. 4 illustrates a flowchart of a method for estimating a significance of a backup.

As previously mentioned, the calculation of the significance score may be quite involved. FIG. 4 illustrates a flowchart of a method 400 for calculating the significance score in accordance with one example that is consistent with the principles of the present invention. The method 400 is just one of many examples that would be consistent with the principles of the present invention. The significance score may be calculated on all of the backup, just the unique portions, and/or just the redundant portions.

Regarding the input data, the method 400 begins by accessing the size of the data (act 401). This size might be the unencrypted and uncompressed version of the data. The compression ratio is largely a function of the compression algorithm and on the information redundancy in the data being compressed, and thus is not considered relevant in determining the significance of the data. Accordingly, the size of the uncompressed data is more directly relevant of the significance of that data. Furthermore, the size increase due to encryption is a function of the encryption algorithm, not the significance of the data being encrypted, and thus this size increase is also not particularly relevant to the significance of the data being encrypted. Accordingly, it is the unencrypted and uncompressed size that is used to start the method 400. In one embodiment, the significance score is based solely on the size of the data, thereby allowing the remaining acts of the method 400 to be skipped.

Optionally, the amount of storage in the backup that relates to metadata in the file system is subtracted (act 402). This may include the following for each file and folder in the file system: names of files and folders, creation date, last modified and last access date, redundant Access Control Lists (ACLs), and other file system internals. Such metadata relates more to the administration of the file system, and not to the significance of the data in the file or folder.

Then, the amount of storage in the backup that relates to "irrelevant" data is subtracted (act 403). In some cases, this might be nothing. In the Microsoft WINDOWS®, it might involve subtracting the size of pagefile.sys, Temporary Internet Files (e.g., *.tmp file, %temp% (for all users)), the Recycle Bin, transitory logs, backing data for Microsoft Indexing Service, %system%\Downloaded Program Files, %system%\Driver Cache, %system%\Prefetch, %system%\$NtUninstall*$, and other places that were captured in the backup but are typically irrelevant as a measure of significance. Although the examples cited are most relevant to WINDOWS® environments, similar constructs exist in other operating systems as well.

Then, hard and soft links may be adjusted for (act 404). This could involve adding a number representing the additional bytes that are virtually present due to the link, or subtracting bytes that were backed up multiple times because of aliasing, depending on user preference. Recursive links are broken.

Then, the size of duplicate file data may optionally be subtracted (act 405). For example, if a file has been copied to three different folders and backed up three times, two of the copies can be considered irrelevant as they contribute to the significance of the data in the backup.

Then, the security context governing the significance calculation is optionally applied (act 406), and any data from the total that is hidden due to ACLs encompassing the relevant context is subtracted. For example, if the significance of the backup is being evaluated only as it relates to user John Doe, then only files that can be seen by John Doe are counted; the sizes of any other files in the backup should be subtracted. On the other hand, if the significance is being computed to implement a strategy supporting an arbitrary potential user of restored data, then the full file set is relevant.

Optionally, the file data in the backup can be weighted according to type (act 407). For example, "Excel spreadsheets are twice as significant as .txt files" might be a rule. If such rules are in effect, the backup contents are iterated over such that file sizes are multiplied by their appropriate weights.

The significance score could then be weighted according to the identity of the last person who modified the document (act 408), where, for example, more senior individuals in an organization may tend to have a higher weighting, and more junior individuals in an organization may tend to have a lower weighting.

The significance score after all relevant adjustments quantifies a reasonable estimate of the significance of the data, and thus estimates how much interesting data would be unavailable if the backup is moved to less available storage or deleted. Once the relative significance of the data in each backup has been quantified, it is possible to offline the least significant data based purely on this score. Optionally, the significance score may weight the significance score by the age of the backup (act 409) wherein older backups have less weight.

Accordingly, the significance score may take these and a variety of other considerations into account when assigning the significance score of the backup.

When identifying a target availability level for the backup (act 312), the storage hierarchy manager 270 may perform the utility scoring for all backups potentially subjected to promotion or demotion, and then identify which one of the backups that, taken as a whole, frees the requisite storage with the least loss of utility. This may involve examining many mutually-exclusive alternative decisions, since off-lining one backup may preclude off-lining its predecessor while still retaining a given granularity within the relevant time window. An alternative would be to offline the backup associated with the least significant loss in data availability, and repeat as necessary until storage and performance goals are achieved.

Accordingly, the principles of the present invention permit for intelligent automated decision marking on promoting and demoting backups within a storage hierarchy, thereby making more efficient use of storage. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer-implemented method for moving backup data within a storage hierarchy, the method comprising:

an act of calculating uniqueness of the backup data by calculating a size of unique data in the backup data;

an act of estimating a significance of at least a portion of the backup data to provide a significance score that quantifies a priority of the backup data;

an act of identifying a target availability level for the backup data in a storage hierarchy based upon the calculated uniqueness of the backup data and the estimated significance; and an act of moving the backup data from a source availability level to the identified target availability level in the storage hierarchy.

2. A computer-implemented method in accordance with claim 1, wherein the act of moving the backup data to the identified target availability level comprises:

an act of promoting the backup data such that the target availability level has greater access than the source availability level.

3. A computer-implemented method in accordance with claim 2, wherein the source availability level is a first source availability level, the target availability level is a first target availability level and a second source availability level, the method further comprising the following after the act of promoting:

an act of identifying a second target availability level for the backup data in the storage hierarchy based upon the calculated uniqueness of the backup data and the estimated significance of the backup data, the second target availability level having greater access than the second source availability level; and an act of promoting the backup data to the second target availability level.

4. A computer-implemented method in accordance with claim 2, wherein the source availability level is a first source availability level, the target availability level is a first target availability level and a second source availability level, the method further comprising the following after the act of promoting:

an act of re-calculating the uniqueness of the backup data by recalculating a size of unique data in the backup data;

an act of re-estimating the significance of the at least a portion of the backup data to provide a significance score that quantifies a priority of the backup data;

an act of identifying a second target availability level for the backup data in the storage hierarchy based upon the re-calculated uniqueness of the backup data and the re-estimated significance of the backup data, the second target availability level having greater access than the second source availability level; and an act of promoting the backup data to the second target availability level.

5. A computer-implemented method in accordance with claim 2, wherein the source availability level is a first source availability level, the target availability level is a first target availability level and a second source availability level, the method further comprising the following after the act of promoting:

an act of identifying a second target availability level for the backup data in the storage hierarchy based upon the calculated uniqueness of the backup data and the estimated significance of the backup data, the second target availability level having lesser access than the second source availability level; and an act of demoting the backup data to the second target availability level.

6. A computer-implemented method in accordance with claim 2, wherein the source availability level is a first source availability level, the target availability level is a first target availability level and a second source availability level, the method further comprising the following after the act of promoting:

an act of re-calculating the uniqueness of the backup data by recalculating a size of unique data in the backup data;

an act of re-estimating the significance of the at least a portion of the backup data to provide a significance score that quantifies a priority of the backup data;

an act of identifying a second target availability level in the storage hierarchy based upon the re-calculated uniqueness of the backup data and the re-estimated significance of the backup data, the second target availability level having lesser access than the second source availability level; and an act of demoting the backup data to the second target availability level.

7. A computer-implemented method in accordance with claim 1, wherein the act of moving the backup data to the identified target availability level comprises:

an act of demoting the backup data such that the target availability level has a lesser access than the source availability level.

8. A computer-implemented method in accordance with claim 7, wherein the act of demoting the backup data comprises:

an act of deleting the backed up data.

9. A computer-implemented method in accordance with claim 7, wherein the source availability level is a first source availability level, the target availability level is a first target availability level and a second source availability level, the method further comprising the following after the act of demoting:

an act of identifying a second target availability level for the backup data in the storage hierarchy based upon the calculated uniqueness of the backup data and the estimated significance of the backup data, the second target availability level having greater access than the second source availability level; and an act of promoting the backup data to the second target availability level.

10. A computer-implemented method in accordance with claim 7, wherein the source availability level is a first source availability level, the target availability level is a first target availability level and a second source availability level, the method further comprising the following after the act of demoting:

an act of re-calculating the uniqueness of the backup data by recalculating a size of unique data in the backup data;

an act of re-estimating the significance of the at least a portion of the backup data to provide a significance score that quantifies a priority of the backup data;

an act of identifying a second target availability level for the backup data in the storage hierarchy based upon the re-calculated uniqueness of the backup data and the re-estimated significance of the backup data, the second target availability level having greater access than the second source availability level; and an act of promoting the backup data to the second target availability level.

11. A computer-implemented method in accordance with claim 7, wherein the source availability level is a first source availability level, the target availability level is a first target availability level and a second source availability level, the method further comprising the following after the act of demoting:

an act of identifying a second target availability level for the backup data in the storage hierarchy based upon the calculated uniqueness of the backup data and the estimated significance of the backup data, the second target availability level having lesser access than the second source availability level; and an act of demoting the backup data to the second target availability level.

12. A computer-implemented method in accordance with claim 7, wherein the source availability level is a first source availability level, the target availability level is a first target availability level and a second source availability level, the method further comprising the following after the act of demoting:

an act of re-calculating the uniqueness of the backup data by recalculating a size of unique data in the backup data;

an act of re-estimating the significance of the at least a portion of the backup data to provide a significance score that quantifies a priority of the backup data;

an act of identifying a second target availability level in the storage hierarchy based upon the re-calculated uniqueness of the backup data and the re-estimated significance of the backup data, the second target availability level having lesser access than the second source availability level; and an act of demoting the backup data to the second target availability level.

13. A computer-implemented method in accordance with claim 1, wherein the act of estimating a significance of at least a portion of the backup data comprises:

an act of weighting a first portion of the backed up data with a lesser weighting than a second portion of the backed up data.

14. A computer-implemented method in accordance with claim 13, wherein the first portion includes information that is redundant with one or more other backups.

15. A computer-implemented method in accordance with claim 1, wherein the backup data comprises at least portions from a plurality of files.

16. A computer program product comprising one or more computer-readable storage media having thereon computer-executable instructions that, when executed by one or more processors of a computing system, cause the computing system to perform a method for moving backup data within a storage hierarchy, the method comprising:

an act of calculating uniqueness of the backup data by calculating a size of unique data in the backup data;

an act of estimating a significance of at least a portion of the backup data to provide a significance score that quantifies a priority of the backup data;

an act of identifying a target availability level for the backup data in a storage hierarchy based upon the calculated uniqueness of the backup data and the estimated significance; and an act of moving the backup data from a source availability level to the identified target availability level in the storage hierarchy.

17. A computer program product in accordance with claim 16, wherein the one or more computer-readable storage media are physical memory media.

18. A computer-implemented method for moving backed up data within a storage hierarchy, the method comprising:

an act of calculating a size of unique data in the backup data;

an act of estimating a significance of at least a portion of the backup data to provide a significance score that quantifies a priority of the backup data, wherein the significance is a function of a size of the backup data;

a step for obtaining a target availability level in the storage hierarchy for a backup based upon the size of unique data in the backup data and the estimated significance; and an act of moving the backup data to the identified target availability level in the storage hierarchy.

19. A computer-implemented method in accordance with claim 18, wherein the significance is a function of at least one of:

a security context;
a weighting function;
a file type;
a user.

20. A computing system comprising:

one or more processors;

a storage hierarchy having a plurality of availability levels;

a system memory, the system memory having thereon computer-executable instructions that, when executed by one or more processors of a computing system, cause the computing system to perform a method for moving backed up data within the storage hierarchy, the method comprising:

an act of calculating a size of unique data in the backup data;

an act of estimating a significance of at least a portion of the backup data to provide a significance score that quantifies a priority of the backup data;

an act of identifying a target availability level for the backup data in a storage hierarchy based upon the size of unique data in the backup data and the estimated significance; and an act of moving the backup data from a source availability level to the identified target availability level in the storage hierarchy.

* * * * *